(12) United States Patent
Hughes

(10) Patent No.: US 7,052,260 B1
(45) Date of Patent: May 30, 2006

(54) POLYMER PROCESSING SYSTEM INCLUDING DECOMPRESSION CHAMBER AND METHOD FOR USING SAME

(75) Inventor: Roderick E. Hughes, Newport Beach, CA (US)

(73) Assignee: Extrutech International, Inc., Costa Mesa, CA (US)

( * ) Notice: Subject to any disclaimer, the term of this patent is extended or adjusted under 35 U.S.C. 154(b) by 173 days.

(21) Appl. No.: 10/464,285

(22) Filed: Jun. 18, 2003

(51) Int. Cl.
*B29C 47/66* (2006.01)

(52) U.S. Cl. .............................. 425/131.1; 425/376.1; 425/380; 425/382.4; 425/472; 425/449

(58) Field of Classification Search ............. 425/131.1, 425/380, 376.1, 382.4, 472, 449
See application file for complete search history.

(56) References Cited

U.S. PATENT DOCUMENTS

| 3,619,442 | A | 11/1971 | Henderson |
| 3,859,017 | A | 1/1975 | Meudec |
| 4,243,629 | A | 1/1981 | Tramezzani |
| 4,623,502 | A | 11/1986 | Cohen |
| 4,666,649 | A | 5/1987 | Takubo et al. |
| 4,781,560 | A * | 11/1988 | Herbert .................. 425/133.5 |
| 4,886,634 | A | 12/1989 | Strutzel et al. |
| 5,156,796 | A * | 10/1992 | Nakagawa et al. ......... 264/514 |
| 5,211,898 | A * | 5/1993 | Shinmoto .............. 264/173.12 |
| 5,516,472 | A | 5/1996 | Laver |
| 5,916,503 | A | 6/1999 | Rettenbacher |
| 6,005,013 | A * | 12/1999 | Suh et al. ..................... 521/79 |
| 6,080,346 | A * | 6/2000 | Jack .......................... 264/143 |
| 6,117,924 | A | 9/2000 | Brandt |
| 6,129,873 | A | 10/2000 | Shelby et al. |
| 6,328,919 | B1 | 12/2001 | Pham et al. |
| 6,450,739 | B1 * | 9/2002 | Puide et al. ................. 408/144 |

* cited by examiner

*Primary Examiner*—Joseph S. Del Sole
(74) *Attorney, Agent, or Firm*—Stout, Uxa, Buyan & Mullins, LLP; Frank J. Uxa

(57) ABSTRACT

Polymer processing systems are provided including an extrusion assembly, a specially configured decompression chamber assembly, and a die assembly. Such systems are effective to provide shaped polymer products having reduced extrusion markings.

8 Claims, 4 Drawing Sheets

POLYMER PROCESSING SYSTEM INCLUDING DECOMPRESSION CHAMBER AND METHOD FOR USING SAME

BACKGROUND OF THE INVENTION

The present invention relates to polymer processing systems and methods for using same. More particularly, the invention relates to polymer processing systems including decompression chambers preferably structured to provide products which are more aesthetically pleasing, and methods for using such systems.

Polymer processing to produce articles, such as sheets, films, other profiles and the like, has become increasingly important as the use of such articles become more prevalent. Production of polymer products often involves the use of extrusion processing, for example, using screw extruders, other types of extruders and the like, to produce a workable or flowable extruded polymeric material. This extruded polymeric material is often passed through a die configured to produce a polymer product of a desired shape or configuration from the extruded polymeric material.

One disadvantage of such processing is the presence of visually apparent markings, blemishes and the like, such as extrusion marks or markings, in the final product. Such markings and the like are the result of processing in the extrusion assemblies, e.g., the extruder or extruders in which the extruded polymeric material is produced. Because the polymeric material leaving the extrusion assembly is under a substantial degree of stress resulting from work done on the material in the extruder, extrusion markings are produced on this material leaving the extruder. Since the die assembly is often substantially adjacent the extruder or extruders, the extrusion markings often are present in the final shaped polymer product from the die assembly. Such extrusion markings in the final product is aesthetically disadvantageous, may reduce the value of the product and may be so severe as to require expensive reprocessing.

Various approaches have been suggested to avoid such extrusion markings. For example, the production rate of a product can be reduced to allow for less stress to be placed on the polymeric material being passed through the extruder or extruders. Alternatively, or in addition, the distance between the extruder or extruders and the die assembly can be lengthened to allow the extruded polymer material more time before final shaping so that the extrusion markings may become less apparent. However, such approaches reduce production rates and/or increase production costs. In addition, providing longer distances between the extruder(s) and die assembly can be disadvantageous in that polymeric material can hang up within, or even block, the processing system, which can result in system shutdown, leading to substantial additional costs and system downtime.

There continues to be a need for polymer processing systems which reduce extrusion markings in the final shaped polymeric products while, at the same time, avoiding reduced production rates and increased costs.

SUMMARY OF THE INVENTION

New polymer processing systems and methods for using such systems have been discovered. The present systems are straightforward and advantageously provide for effective reduction of extrusion markings, other visually apparent blemishes and the like caused by processing a polymeric material prior to passing the material through a shape-forming die. The present systems provide for such advantages substantially without reducing production rates or increasing operating costs. The present systems take advantage of the flow characteristics of extruded polymeric materials, while being easy to operate and control.

In one broad aspect of the present invention, polymer processing systems are provided which comprise an extrusion assembly, a decompression chamber assembly, and a die assembly. The extrusion assembly is structured to extrude a quality of polymeric material into an extruded polymeric material, preferably a flowable extruded polymeric material.

The decompression chamber assembly of the present system is positioned and structured to receive the extruded polymeric material from the extrusion assembly. The decompression chamber assembly includes a decompression chamber which has an outer wall defining a hollow space including an entrance zone, a generally oppositely located exit zone and a central zone located therebetween. The entrance zone and the exit zone preferably, though not necessarily, are substantially longitudinally aligned, for example, along a central longitudinal axis of the hollow space. The entrance zone is positioned such that the extruded polymeric material enters the decompression chamber through the entrance zone. Extruded polymeric material leaves the decompression chamber through the exit zone. The hollow space has an increased cross sectional area perpendicular to the central longitudinal axis of the hollow space at the central zone relative to at at least one of, and preferably at both of, the entrance zone and the exit zone.

Such configuration of the decompression chamber advantageously provides a location where the extruded polymeric material can relax or be subjected to reduced strain and/or stress or otherwise be subjected to conditions effective to reduce, or even substantially eliminate, unwanted extrusion markings, blemishes and the like defects often formed in the polymeric material during extrusion processing.

The die assembly is positioned and structured to receive the extruded polymeric material from the decompression chamber assembly and form the extruded polymeric material into a desired shape, for example, sheet, film or the like.

Advantageously, the decompression chamber, as described herein, is structured to pass substantially all of the extruded polymeric material entering the decompression chamber out of the decompression chamber. In this embodiment, substantially none of the polymeric material entering the decompression chamber is held up or hangs up in the decompression chamber. Of course, the configuration of the decompression chamber may cause the polymeric material to remain in the decompression chamber for a longer period of time relative to the period of time the material remains in an identical decompression chamber without an increased cross sectional area perpendicular to the central longitudinal axis of the hollow space at the central zone, as in the present invention. However, after steady state operation is achieved, the rate at which the polymeric material enters the present decompression chamber preferably is substantially equal to the rate at which the polymeric material exits the decompression chamber and substantially no polymeric material is held up or hangs up in the decompression chamber.

In one very useful embodiment, the decompression chamber is free of any rotatable component. In certain prior art systems, a so-called decompression zone was provided in a space within a rotating extruder, for example, a screw extruder, with a rotating central element located within the decompression zone and screw-like blade located on either side of the decompression zone. In the present embodiment, no screw-like blades or central rotatable element is provided within the decompression chamber. A decompression chamber having a hollow space without screw-like blades and/or a rotatable component is highly advantageous in allowing the extruded polymeric material to relax or otherwise be subjected to conditions so as to reduce extrusion markings and the like defects.

The decompression chamber preferably includes no inner wall. In a more preferred embodiment, the hollow space defined by the outer wall of the decompression chamber is substantially completely hollow and has no member or other elements located therein.

The outer wall of the decompression chamber advantageously is substantially smooth. This feature is effective in facilitating passing substantially all of the polymeric material entering the decompression chamber through and out of the decompression chamber. The decompression chamber preferably is in communication with no substantial source of suction. Thus, preferably, the force provided by the extruder or extruders, for example, the screw extruder or extruders, is sufficient to cause the extruded polymeric material to pass from the extruder or extruders through the decompression chamber and through the die assembly to provide a product of a desired shape and configuration.

In addition, the cross sectional area perpendicular to the central longitudinal axis of the hollow space defined by the outer wall of the decompression chamber advantageously varies so as to facilitate the passing of substantially all of the extruded polymeric material entering the decompression chamber out of the chamber.

In one useful embodiment, the outer wall of the decompression chamber includes a first region defining increasing cross sectional areas perpendicular to the central longitudinal axis of the hollow space and a second region, spaced apart from the first region, defining decreasing cross sectional areas perpendicular to the central longitudinal axis of the hollow space. At least a portion, preferably a substantial portion, and more preferably a major portion (at least about 50%) of the first region and the second region is preferably oriented at an angle in a range of about 10° to about 40°, more preferably about 15° to about 30°, for example, about 20°, relative to central longitudinal axis of the hollow space. It has been found that such orientation is highly effective in providing for or in facilitating the passing of substantially all of the extruded polymeric material entering the decompression chamber out of the chamber.

The specific configuration chosen for the decompression chamber depends, for example, on the type of extruded polymeric material being processed, the processing conditions being employed, the flow properties, e.g., viscosity, of the extruded polymeric material being processed and the like and other factors. In any event, it has been found that the use of the present systems, including the decompression chambers and decompression chamber assemblies as set forth herein, cost effectively provide aesthetically pleasing polymer products.

The present systems preferably further include an entrance block including a through aperture structured to pass extruded polymeric material from the extrusion assembly to the decompression chamber. The present systems may further include an exit block structured to receive the extruded polymeric material from the decompression chamber and provide the extruded polymeric material to the die assembly.

The present extrusion assemblies may include one or more extruders, for example and without limitation, at least one screw extruder, or two or more screw extruders. If two or more screw extruders are used, individual decompression chambers, as described herein, may be used for each screw extruder or the plurality of screw extruders can be used to provide extruded polymeric material to the same decompression chamber, as described herein.

In one embodiment, where two or more extruders are provided, each of the extruders advantageously produces a stream, for example, a so called ribbon, of extruded polymeric material, and the system further comprises an orifice block positioned and structured to combine the streams or ribbons of extruded polymeric material into a combined stream or ribbon of extruded polymeric material to be passed to the decompression chamber.

The present methods of processing polymeric material generally comprise passing an extruded polymeric material through a decompression chamber, as described elsewhere herein. Such methods are highly effective in providing aesthetically pleasing, shaped polymeric products at commercially acceptable production rates in a cost effective manner.

In another broad aspect of the present invention, decompression assemblies are provided which comprise an entrance block, a decompression chamber and an exit block. The entrance block includes a through aperture structured to pass extruded polymeric material, for example, flowable extruded polymeric material into the decompression chamber. The decompression chamber is as described elsewhere herein. The exit block is structured to receive extruded polymeric material from the exit zone of the decompression chamber.

Each and every feature described herein, and each and every combination of two or more of such features, is included within the scope of the present invention provided that the features included in such a combination are not mutually inconsistent.

These and other aspects of the present invention are set forth in the following detailed description, examples and claims, particularly when considered in conjunction with the accompanying drawings in which like parts bear like reference numerals.

BRIEF DESCRIPTION OF THE DRAWINGS

FIG. 1 is a cross sectional view of a portion of the system shown in FIG. 1a.

DETAILED DESCRIPTION OF THE INVENTION

Figure 1:
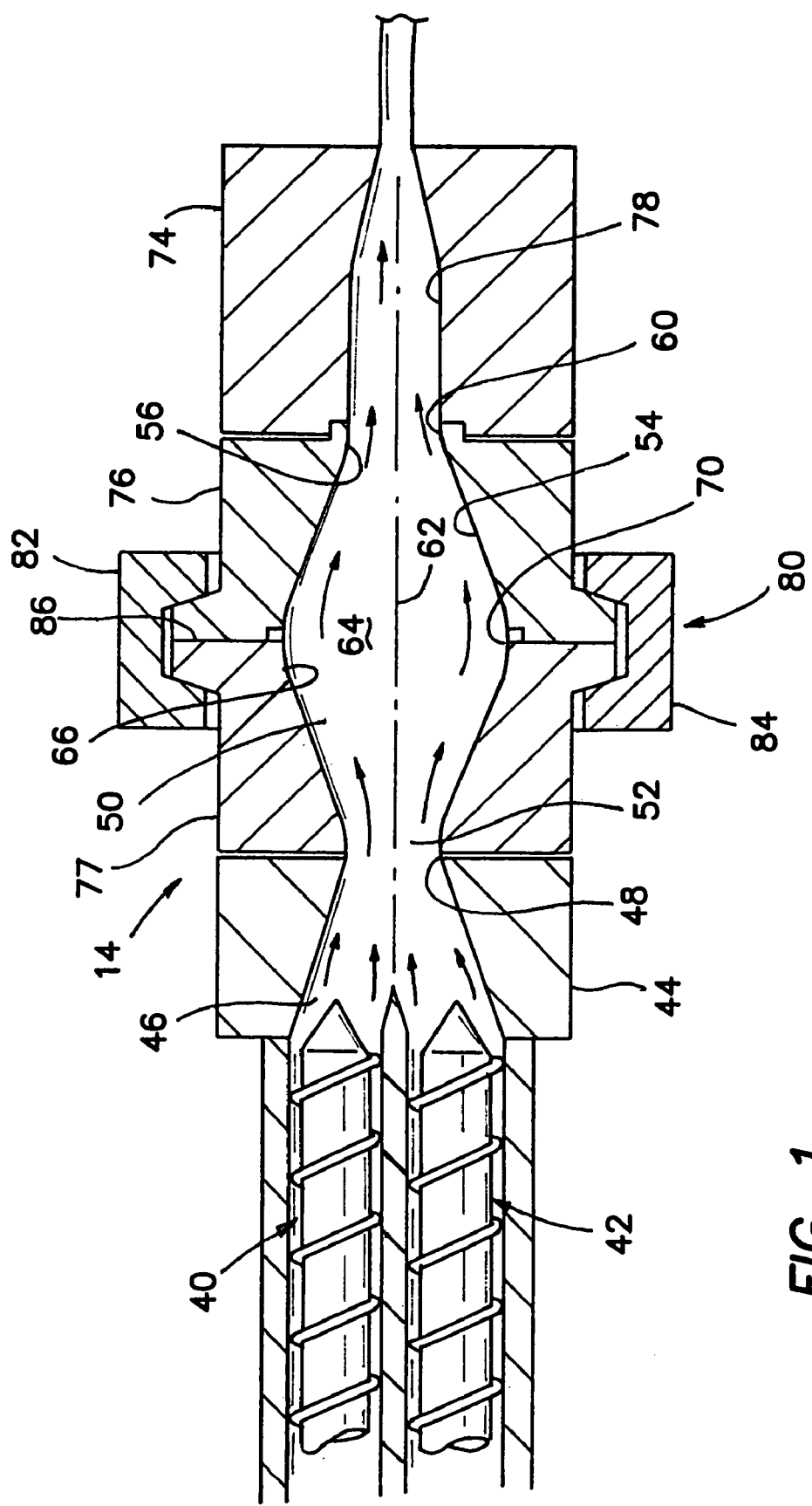

The present invention relates to systems for processing polymeric materials.

Although any suitable type of polymeric material may be processed using the present systems, advantageously thermoplastic polymeric materials effective to be die formed into products, such as sheets, films and the like shapes, are used. FIG. 1a is a schematic view showing one embodiment of such a system in accordance with the present invention. In FIG. 1A, the system 10 includes a polymer extrusion assembly 12, a decompression chamber assembly 14 and a die assembly 16. The result of processing a polymeric material through the system is a shaped polymer product 18.

The polymer extrusion assembly 12 may be any suitable polymer extrusion assembly, for example, a conventional or substantially conventional assembly, such as an extrusion assembly including one or two or more conventional or substantially conventional screw extruders. The function of polymer extrusion assembly 12 is to produce a workable or flowable extruded polymeric material for further processing in system 10.

The extruded polymeric material from polymer extrusion assembly 12 passes into decompression chamber assembly 14, to be described in detail hereinbelow. Passing the extruded polymeric material through the decompression chamber assembly 14 is effective to relax and/or otherwise condition the extruded polymeric material so as to reduce extrusion markings and/or other blemishes and/or other visually apparent defects or distortions in the extruded polymeric material, for example, caused or formed during the extrusion processing in the extrusion assembly 12.

The extruded polymeric material passes through the decompression chamber assembly 14 and is processed through a die assembly 16. Die assembly 16 may be any suitable such assembly, for example, a conventional or substantially conventional polymeric material die assembly, effective to form the extruded polymeric material from the decompression chamber assembly 14 into a polymer product of the desired shape/configuration, such as shaped polymer product 18. In one useful embodiment, die assembly 16 is effective to produce a sheet or film of the extruded polymeric material which has enhanced aesthetic appearance relative to such a polymer product produced by a system identical to system 10 without decompression chamber assembly 14.

As noted above, one or both of the polymer extrusion assembly 12 and the die assembly 16 may be selected from conventional such assemblies. However, the decompression chamber assembly 14 of system 10 is particularly structured/configured in accordance with the present invention to advantageously provide shaped polymer products, such as shaped polymer product 18, which have enhanced aesthetic appearance and can be produced cost effectively.

Thermoplastic polymeric resins processed in accordance with the present invention include without limitation, high-density polyethylene, low-density polyethylene, polypropylene, copolymers between ethylene and propylene and between ethylene, propylene and another α-olefin, polystyrene, acrylonitrile/butadiene/styrene (ABS) copolymers, acrylonitrile/styrene/acrylic (ASA) copolymers, polyamides, polyesters, polycarbonates, polyvinyl chloride, polyvinylidene chloride, polyphenylene oxide, polyimides, polysulfones, polyphenylene sulfide, and the like and mixtures thereof.

Figure 2:
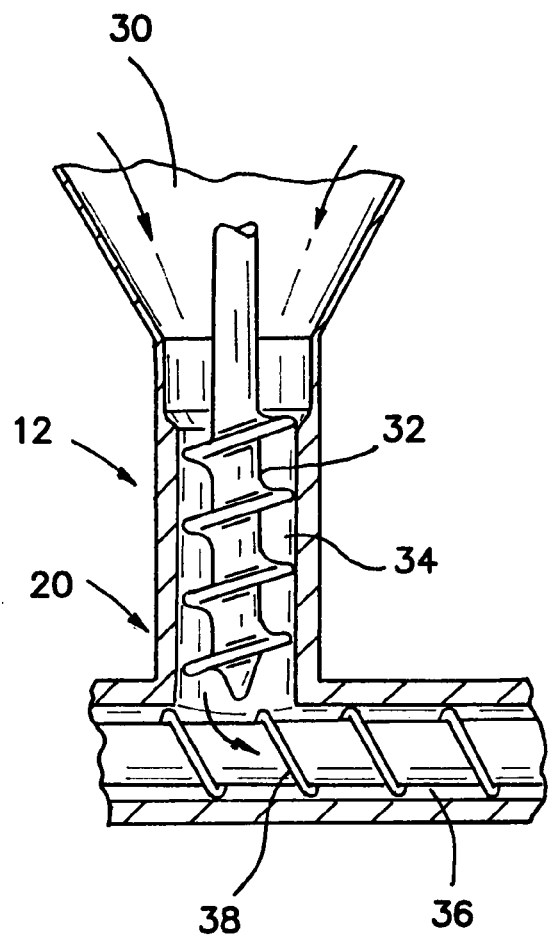
FIG. 2 is a cross sectional view of another portion of the system shown in FIG. 1.

The feed portion of screw extruder 20 of polymer extrusion assembly 12 is shown in some detail in FIG. 2. Pellets of thermoplastic polymeric material are fed through port 30 and are passed, using feed screw 32, through feed portion 34 into the main screw compartment 36. It is often not necessary to use a feed screw, such as feed screw 32, particularly if pellets of polymeric material are fed to extrusion assembly 12. The pellets are melted as they are passed through main screw compartment 36 of extrusion assembly 12. The system 10 advantageously is heated from the main screw compartment 36 through the decompression chamber assembly 14 and die assembly 16 to facilitate melting the polymeric material particles and to maintain the polymeric material being passed through the system in a suitable flowable state. The polymeric material is fed under pressure in the main screw compartment 36 from left to right in FIG. 2, while being kneaded by the propelling force of the main screw 38.

The main screw 38 can be exemplified as having a compression ratio in the range of about 0.5 to about 2, preferably about 0.6 to 1.5. The term "compression ratio" means the depth of the screw channel at the start portion of polymeric material flow/the depth of the screw channel at the end portion of polymeric material extrusion, when the pitch of the screw is constant in each of the sections of the screw. The compression ratio at the beginning of the screw is determined by the type of polymeric material being processed, the rate of extrusion, the condition of the remainder of the system 10 and the like. In one useful embodiment a straight screw is provided having a compression ratio of about 1.

The power or force provided by the screw should be such as to provide proficient propulsion for the extruded polymeric material to pass through the decompression chamber assembly 14 and the die assembly 16.

The main screw 38 employed in the polymer extrusion assembly 12, shown partially in FIG. 2, may be of any type, for example, a straight type, a type of an equidistant pitch and variable in the depth of screw channel, a type of a constant depth of screw channel and variable in the pitch, a rapid compression type and the like.

Although excessive force on the polymeric material and kneading of the polymeric material by main screw 38 are to be avoided, it is important that the polymeric material be provided with sufficient propulsion so that the final shaped product is effectively formed and that the polymeric material be substantially uniform. Because the decompression chamber assembly 14 is effective to reduce markings in the polymeric material caused by the extrusion processing, adequate and effective amounts of propelling force and mixing force can be applied to the polymeric material by main screw 38 and polymer extrusion assembly 12 substantially without adversely affecting the aesthetic appearance of the final shaped polymer product.

It should be noted that the screw extruders employed in the present systems may be similar to those screw extruders which are conventionally used in polymer processing.

Figure 1A:
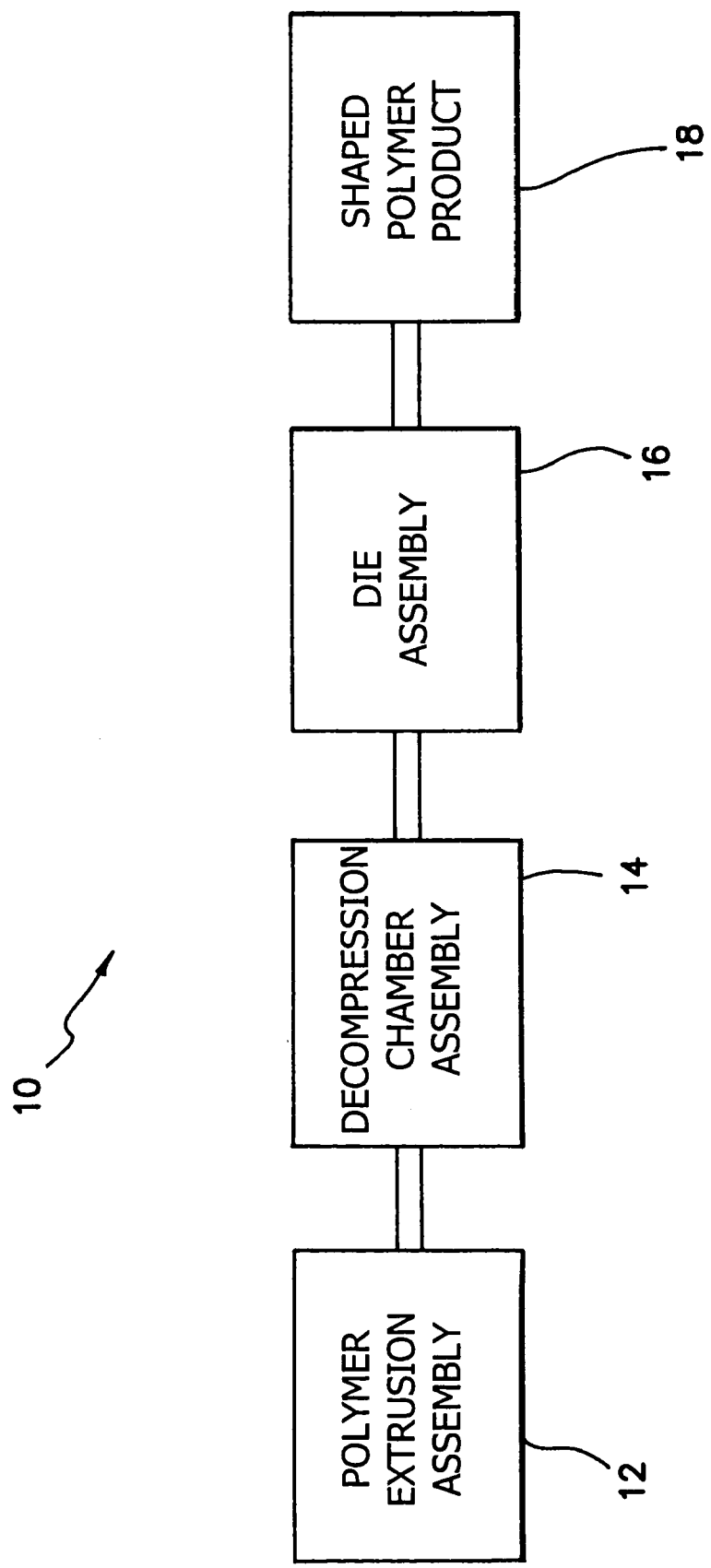
FIG. 1a is a schematic flow diagram of a polymer processing system in accordance with the present invention.

Referring now to FIG. 1, the distal end portions of screw extruders 40 and 42 are shown joined to an entrance block 44. Each of the screw extruders 40 and 42 is structured substantially similarly to extruder 20 described previously. The extruders 40 and 42 are positioned so as to provide a ribbon or stream of extruded polymeric material to the aperture 46 of entrance block 44.

It should be noted that a single screw extruder can be used to provide extruded polymer material to aperture 46. In addition, although one or more screw extruders are very useful, the present systems may include one or more extruders of other types and such systems are included in the scope of the present invention.

The extruded polymeric materials from screw extruders 40 and 42 are combined in aperture 46 of entrance block 44 and pass through entrance opening or inlet 48 into decompression chamber 50 of decompression chamber assembly 14.

Decompression chamber 50 includes inlet 48, entrance zone 52, outer wall 54, exit zone 56, and exit opening or outlet 60. The cross sectional areas of the entrance zone 52 and exit zone 56 perpendicular to the longitudinal axis 62 of hollow space 64 of the decompression chamber 50 are substantially equal, although such cross sectional areas can be unequal in accordance with the present invention. The decompression chamber 50 includes a central zone 66 where the cross sectional area of the hollow space 64 is increased relative to the cross sectional area of either the entrance zone 52 or the exit zone 56.

Thus, the cross sectional area of the hollow space 64 perpendicular to the longitudinal axis 62 at the entrance zone 52 increases as you move toward the maximum cross sectional area substantially at the center 70 of the hollow space. As you move further towards the exit zone 56, the cross sectional area of the hollow space 64 (perpendicular to the longitudinal axis 62) decreases.

Substantial portions, even major portions, of the outer wall 54 between the entrance zone 52 and the central zone 66, and between the central zone 66 and the exit zone 56 are oriented at an angle of about 20° relative to the central longitudinal axis 62 of the hollow space 64. In addition, the outer wall is substantially smooth, for example, includes substantially no sharp or protruding edges.

All of these features are designed to provide all of the extruded polymeric material entering the decompression chamber 50 exits the decompression chamber 50 without hanging up in the chamber. The shape and configuration of the decompression chamber 50 is very effective in providing a location for the extruded polymeric material to relax or otherwise be subjected to conditions so that unsightly markings or blemishes, for example, formed in the extruded polymeric material in the screw extruders 40 and 42, can be reduced. Such reduction in extrusion markings and/or other blemishes enhances the aesthetic quality of the final polymer product obtained by system 10.

It is important to note, unlike many prior art decompression chambers, the present chamber includes no screw extruder mechanism, for example no screw or no rotating shaft. Thus, the extruded polymeric material in decompression chamber 50 is subjected to reduced stress which has been found to be effective in reducing extrusion markings and the like.

Moreover, it is somewhat surprising that extruded polymeric material advantageously passes through the decompression chamber 50 without material hang-up. Without wishing to limit the invention to any particular theory of operation, it is believed that the configuration of the decompression chamber 50 facilitates effective passage of substantially all of the polymeric material through the decompression chamber. One or more features, such as a substantially smooth outer wall, a properly angled outer wall, and the like are believed to be effective in facilitating the passage of the material through the decompression chamber 50 while, at the same time, allowing the extruded polymeric material to effectively reduce extrusion markings and the like blemishes.

An exit block 74 is coupled to the decompression chamber component 76 so that the extruded polymeric material from the decompression chamber 50 passes through opening 78 on its way toward die assembly 18.

Figure 3:
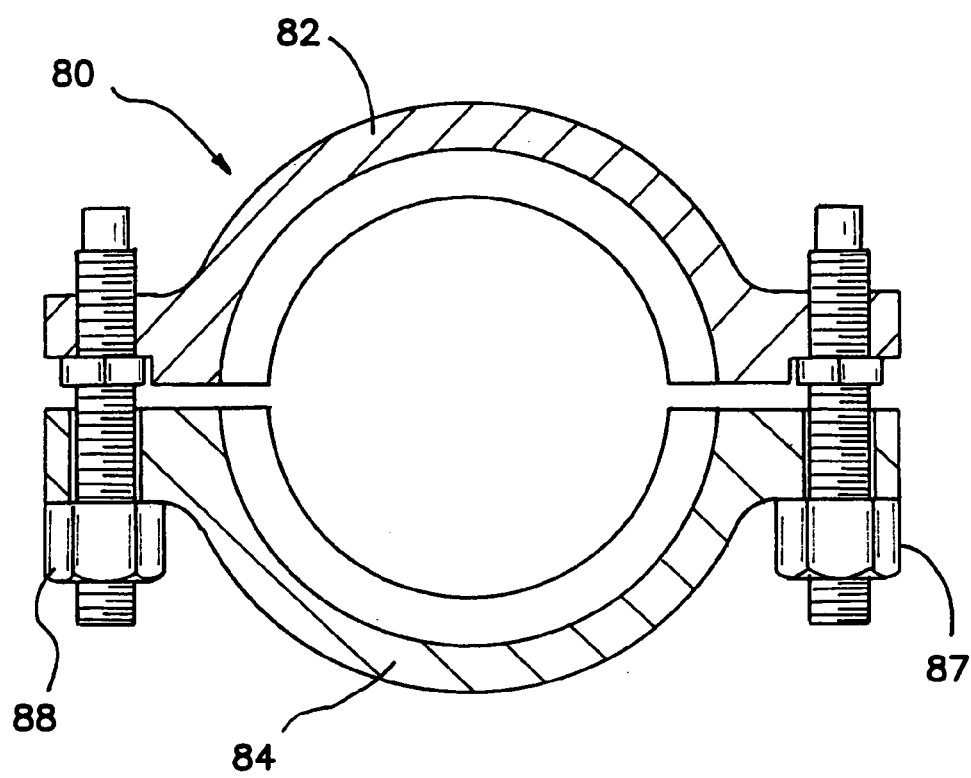
FIG. 3 is a cross sectional view of a bracket structure used to hold the decompression chamber shown in FIG. 1 together.

With reference to FIGS. 1 and 3, one construction of a bracket structure, shown generally at 80, used to hold decompression chamber 50 together is shown. In this construction, the decompression chamber components 76 and 77 are formed and are brought together. Collar elements 82 and 84 are placed over the joint 86 between the components 76 and 77. Using conventional screw and nut combinations 87 and 88 the two collar elements 82 and 84 are tightened around the joint 86 to securely join components 76 and 77 together, as shown in FIGS. 1 and 3.

It should be noted that other constructions may be employed to provide the compression chamber in accordance with the present invention. For example, and without limitation, the decompression chamber components 76 and 77 can be formed with outwardly extending flanges including a plurality of apertures. Bolts can be passed through the apertures and secured in place using nuts and the like, thereby directly coupling components 76 and 77 together. Additional constructions may be employed to provide the present decompression chambers and systems. All such constructions are within the scope of the present invention.

As the extruded polymeric material passes from the decompression chamber assembly 14 to the die assembly 16, the material continues to be propelled by the force of the screws in screw extruders 40 and 42. The present systems are associated with no other source of suction. The extruded polymeric material passes through the die assembly 16 to shape the extruded polymeric material into a desired form, such as a film or sheet.

Figure 4:
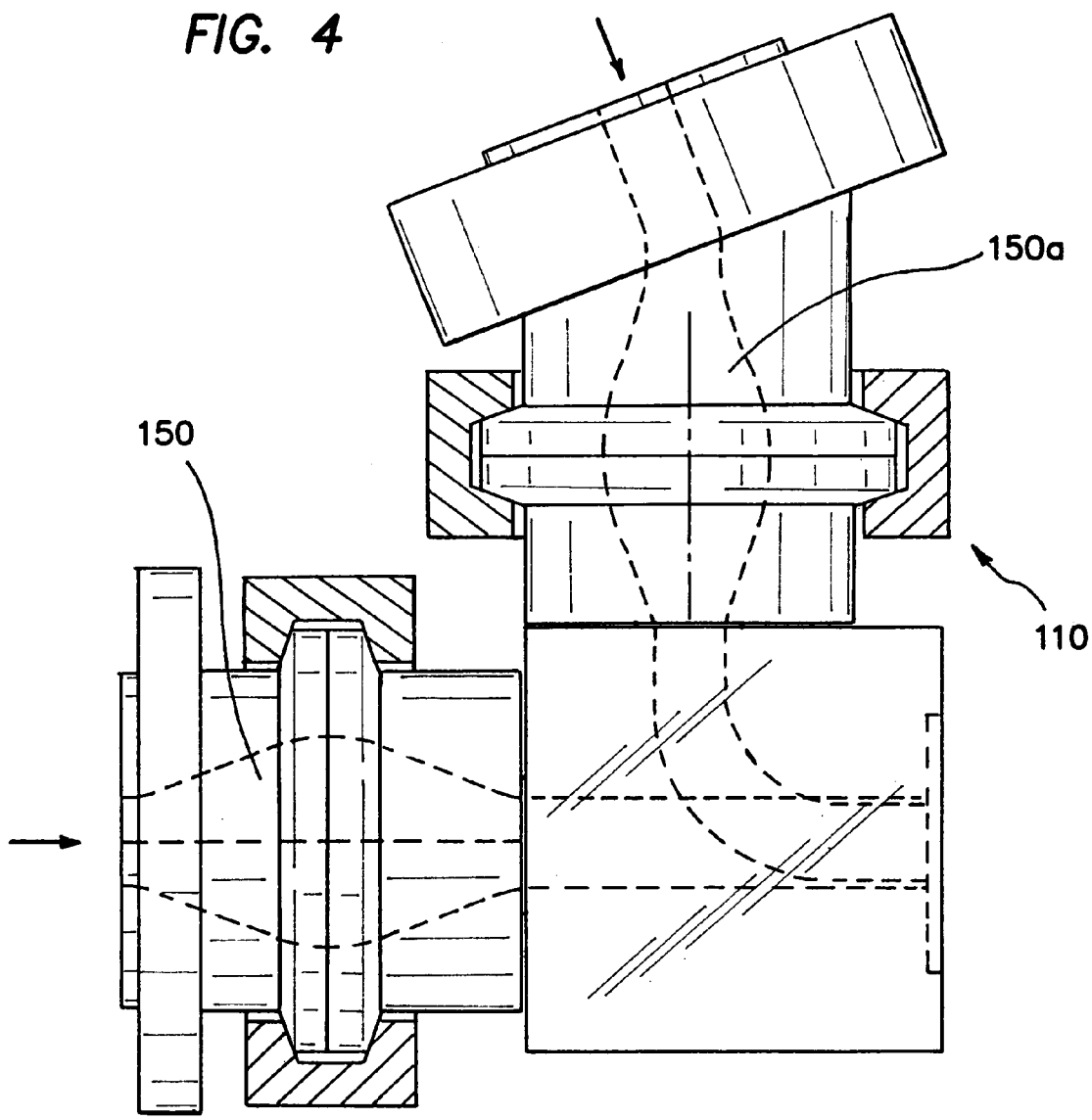
FIG. 4 is the schematic view of a system in accordance with the present invention of an alternate embodiment of a system in accordance with the present invention.

With reference to FIG. 4, a portion of an alternate system 110 in accordance with the present invention is shown in which each of two streams of extruded polymeric material, from individual screw extruders, is passed through an individual decompression chamber 150, 150*a* configured similarly to that described previously. In this embodiment a composite, shaped polymer product, for example, a two layer film or sheet is produced, in a die assembly such that both layers have reduced extrusion markings or other visually apparent blemishes.

Additional processing, such as that conventionally employed in producing polymeric shapes or products through die assemblies, may be employed with the present systems to produce the final shaped polymeric product. In any event, it has been found that the final shaped polymeric product, for example, film or sheet product, has a reduced degree of extrusion markings and/or other blemishes relative to an identical product produced using an identical system without the present decompression chamber. Moreover, such aesthetically pleasing product is provided without reducing production rates and in a cost effective way without polymeric material hang up in the system. In short, the present invention is highly cost effective, performance effective and provides a product having an enhanced appearance which promotes saleability and reduces or even eliminates the need for reprocessing.

While this invention has been described with respect to various specific examples and embodiments, it is to be understood that the invention is not limited thereto and that it can be variously practiced within the scope of the following claims.

What is claimed is:

1. A polymer processing system comprising:
   an extrusion assembly structured to extrude a quantity of polymeric material into a flowable extruded polymeric material;
   a decompression chamber positioned and structured to receive the flowable extruded polymeric material, the decompression chamber having an outer wall defining a hollow space having a length and including an entrance zone through which the flowable extruded polymeric material enters the decompression chamber, a generally oppositely located exit zone through which the flowable extruded polymeric material leaves the decompression chamber and a central zone located therebetween, the hollow space having an increased cross-sectional area perpendicular to the central longitudinal axis of the hollow space at the central zone relative to at at least one of the entrance zone and the exit zone and a substantially continuously varying cross-sectional area perpendicular to the central longitudinal axis of the hollow space along substantially the entire length of the hollow space; and a die assembly positioned and structured to receive the flowable extruded polymeric material from the decompression chamber and form the flowable extruded polymeric material into a shaped product, the decompression chamber being separate and apart from the die assembly.

2. The system of claim 1 wherein the hollow space has an increased cross-sectional area perpendicular to the central longitudinal axis of the hollow space at the central zone relative to at both the entrance zone and the exit zone.

3. The system of claim 1 wherein the decompression chamber is free of any rotatable component.

4. The system of claim 1 wherein the outer wall includes a first region defining increasing cross-sectional areas perpendicular to the central longitudinal axis of the hollow space and a second region, spaced apart from the first region, defining decreasing cross-sectional areas perpendicular to the central longitudinal axis of the hollow space, wherein at least a portion of each of the first region and the second region is oriented at an angle in a range of about 10° to about 40° relative to the central longitudinal axis of the hollow space.

5. The system of claim 1 which further comprises an entrance block including a through aperture structured to pass the flowable extruded polymeric material from the extrusion assembly to the decompression chamber.

6. The system of claim 1 which further comprises an exit block structured to receive the flowable extruded polymeric material from the decompression chamber and provide the flowable extruded polymeric material to the die assembly.

7. The system of claim 1 wherein the extrusion assembly includes one screw extruder, or two or more screw extruders.

8. The system of claim 7 wherein each of the screw extruders produces a ribbon of extruded polymeric material, and the system further comprises an orifice block positioned and structured to combine the ribbons of extruded polymeric material into a combined ribbon of extruded polymeric material to be passed to the decompression chamber.

* * * * *